March 19, 1946.  F. H. VALITON  2,396,903

MIXING PADDLE

Filed Jan. 12, 1945

INVENTOR.
Frederick H. Valiton
BY *Victor J. Evans & Co.*
ATTORNEYS

Patented Mar. 19, 1946

2,396,903

UNITED STATES PATENT OFFICE 2,396,903

MIXING PADDLE

Frederick H. Valiton, Deer Lodge, Mont.

Application January 12, 1945, Serial No. 572,549

3 Claims. (Cl. 259—144)

This invention relates to mixing paddles and more particularly, to a mixing paddle for stirring lumpy and hard to dissolve mixtures.

Another object of the invention is to provide a mixing paddle which will mix as well as strain the mixture.

A further object of the invention is to provide a mixing paddle that will scrape all lumps or sediment from the container and thoroughly mix and separate the lumps and sediment.

Other objects and advantages of the invention will become apparent as the description progresses.

In the accompanying drawing forming a part of this specification and in which like numerals are employed to designate corresponding parts throughout.

Figure 1:
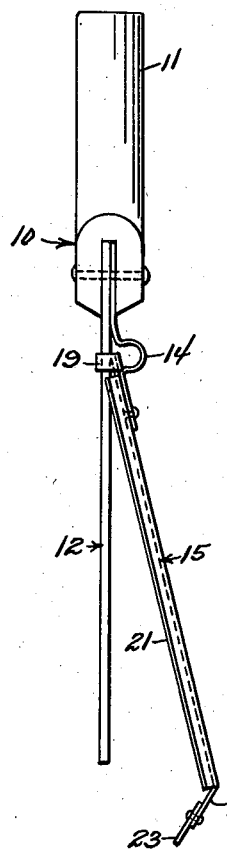
Figure 1 is a side view of the device embodying the invention, in operating position.
Figure 2:
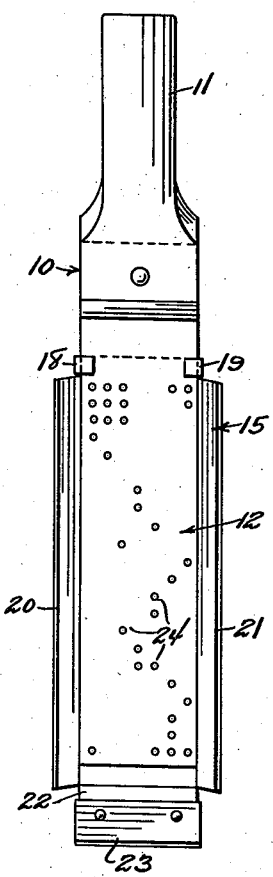
Figure 2 is a front view thereof in normal position.
Figure 3:
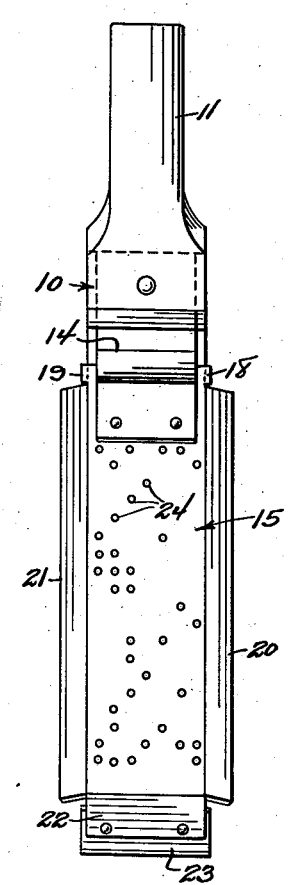
Figure 3 is a rear view of the same.
Figure 4:
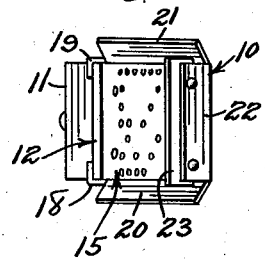
Figure 4 is a perspective view of the perforated plate 15.
Figure 5:
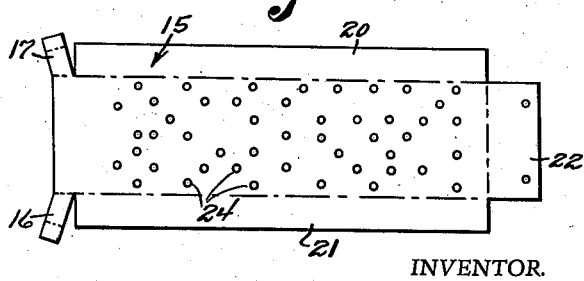
Figure 5 is a view of the perforated plate 15 before being completely formed.

Referring more particularly to the drawing wherein for the purpose of illustration is shown a preferred embodiment of the invention, 10 designates the mixing paddle having a handle 11 to which is attached by means of a rivet, a perforated plate 12 and a flat spring loop 14 which gives the paddle 10 more flexibility and prevents breakage, secured to the lower end of spring 14 by means of rivets is a perforated plate 15. The flat surface of plate 15 is of a sufficient width to register with the flat surface of plate 12, projections 16 and 17 formed at the upper end of plate 15 are bent in U-loops 18 and 19 and are adapted to engage the plate 12 at the upper end thereof. The loops 18 and 19 determine and regulate the distance, the plates 12 and 15 can be separated to prevent breakage of the spring loop 14. The flat surface of the plate 15 will however remain parallel to and in face to face relationship with the flat surface of the plate 12 since the flat spring loop 14 normally holds the inner surfaces of the perforated plates 12 and 15 together. But during operation of the paddle when the shoe 23 is drawn across the bottom of the container the perforated plates 12 and 15 will be separated, against the tension of the spring loop 14, the point of separation being determined by the U-loops 18 and 19. With the two plates normally held together in this manner the device can be used as an ordinary paddle.

The sides or edges of plate 15 are bent to form wing portions 20 and 21. The lower end portion 22 of plate 15 is bent at an angle and is adapted to have riveted thereto a shoe 23 which is made of fiber or any other like material. This shoe creates a drag on the plate 15 when the mixing paddle 10 is drawn across the container. Thus all lumps or sediment are scraped from the bottom of the container and forced up between the plates 12 and 15. Therefore when the paddle 10 is drawn across the container, the shoe 23 acting as a drag forces the plates 12 and 15 to be separated to an angle determined by the U-loops 18 and 19, as shown in Fig. 1. The lumps and sediment scooped upward by the shoe 23 are directed by means of wing portions 20 and 21 toward the flat surfaces of plates 12 and 15.

When the mixing paddle 10 is moved in the opposite direction, the plates 12 and 15 are forced together and the lumps and sediment are compressed by the plates 12 and 15 and forced through the perforation 24 in both plates. This operation is thus performed with the aid of the tension of the spring loop 14 which acts in the dual capacity of spring and hinge, since the spring loop 14 normally holds the inner flat surfaces of the plates 12 and 15 together and prevents displacement of the plates during the mixing operation.

By this operation, the mixture is thoroughly mixed and strained in one operation.

While the plates 12 and 15 as shown are perforated, it is not deemed to be beyond the scope of the invention to make these plates of a mesh material that can be retained in place by means of a frame conforming to the shape and size of plates 12 and 15.

It is to be understood that the form of the invention herewith shown and described is to be taken as a preferred example of the same and that various changes relative to the material, size, shape, and arrangement of parts, may be resorted to without departure from the spirit of the invention or the scope of the subjoined claims.

Having thus described the invention, what is claimed is:

1. A mixing paddle, comprising a handle, a perforated plate attached to said handle, a loop spring connected to said handle, a perforated plate attached to said spring, said spring being adapted to position said plates in angular relationship to each other and means on one of said plates for limiting the angular relationship of said plates.

2. The invention as described in claim 1 wherein one of said plates is provided with wing portions.

3. The invention as described in claim 1 wherein one of said plates is provided on the sides thereof with inwardly inclined wing portions and on the bottom edge thereof with an inwardly inclined scraper portion.

FREDERICK H. VALITON.